United States Patent
Li

(10) Patent No.: US 10,030,754 B2
(45) Date of Patent: Jul. 24, 2018

(54) TORQUE CONVERTER WITH FLUID COUPLING DAMPER

(71) Applicant: GM GLOBAL TECHNOLOGY OPERATIONS LLC, Detroit, MI (US)

(72) Inventor: Dongxu Li, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/225,085

(22) Filed: Aug. 1, 2016

(65) Prior Publication Data

US 2018/0031100 A1 Feb. 1, 2018

(51) Int. Cl.
  *F16H 45/02* (2006.01)
  *F16D 13/40* (2006.01)
  *F16H 61/14* (2006.01)

(52) U.S. Cl.
  CPC ............ *F16H 45/02* (2013.01); *F16D 13/40* (2013.01); *F16H 61/143* (2013.01); *F16H 2045/0221* (2013.01)

(58) Field of Classification Search
  CPC ................ F16H 45/02; F16H 61/143; F16H 2045/0221; F16D 13/40
  See application file for complete search history.

(56) References Cited

U.S. PATENT DOCUMENTS

| 2011/0240432 A1* | 10/2011 | Takikawa | F16H 45/02 192/3.29 |
| 2012/0160628 A1* | 6/2012 | Vanni | F16H 45/02 192/3.28 |
| 2014/0008174 A1* | 1/2014 | Tomiyama | F16H 45/02 192/203 |
| 2014/0251746 A1* | 9/2014 | Ito | F16F 15/134 192/70.11 |

* cited by examiner

*Primary Examiner* — David J Hlavka
(74) *Attorney, Agent, or Firm* — Quinn IP Law

(57) ABSTRACT

A torque converter is provided. The torque converter, or torque converter assembly, operatively connects a primary mover and a transmission, and includes an input rotationally connected to the primary mover and an output rotationally connected to the transmission. The torque converter includes a fluid coupling having impeller blades and turbine blades. The fluid coupling transfers torque between the impeller blades and the turbine blades when the input and the output are rotating at different speeds. A mini damper is disposed in line with the fluid coupling between the input and the output. A torque converter clutch is configured to selectively slip or selectively lock, such that torque may be transferred directly between the input and the output. A primary damper is disposed between the input and the output.

9 Claims, 4 Drawing Sheets

TORQUE CONVERTER WITH FLUID COUPLING DAMPER

TECHNICAL FIELD

This disclosure generally relates to torque converters.

BACKGROUND

Torque converters are couplings that allow primary movers, such as engines, to spin somewhat independently of transmissions. Automatic transmissions, semi-automatic transmissions, and other powertrain architecture types may use torque converters. In some configurations, torque converters are also capable of multiplying torque delivered to the transmission.

SUMMARY

A torque converter is provided. The torque converter, or torque converter assembly, operatively connects a primary mover and a transmission, and includes an input rotationally connected to the primary mover and an output rotationally connected to the transmission.

The torque converter includes a fluid coupling having impeller blades and turbine blades. The fluid coupling transfers torque between the impeller blades and the turbine blades when the input and the output are rotating at different speeds. A mini damper is disposed in line with the fluid coupling between the input and the output.

A torque converter clutch is configured to selectively slip or selectively lock, such that torque may be transferred directly between the input and the output. A primary damper is disposed between the input and the output.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
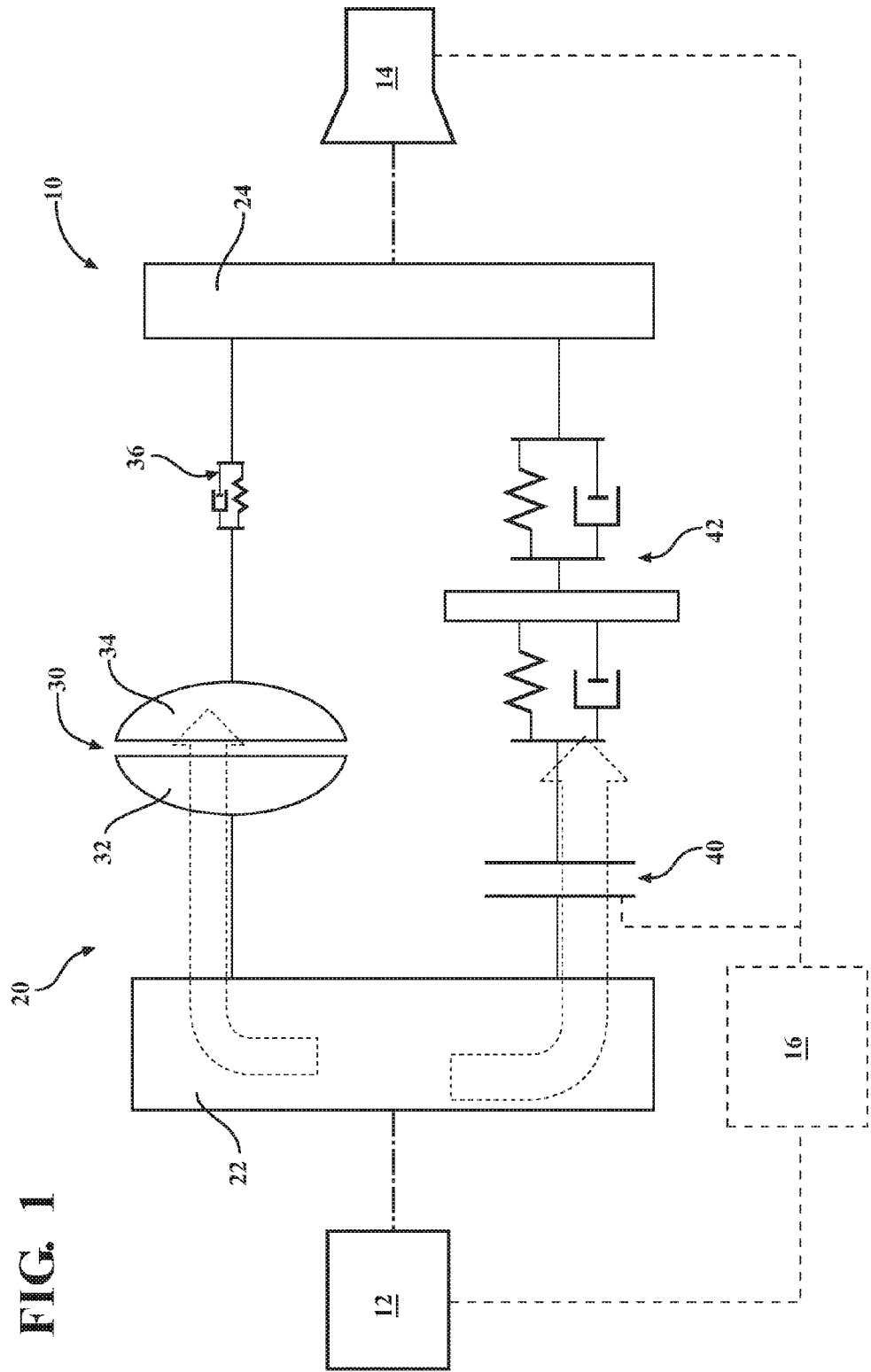
FIG. 1 is a schematic diagram of a portion of a vehicle powertrain, schematically illustrating alternative flow paths through a torque converter having a damper in series with a fluid coupling.

In the drawings, like reference numbers correspond to like or similar components whenever possible throughout the several figures. There is shown in FIG. 1 a schematic diagram of portions of a powertrain for a vehicle 10, including a primary mover 12 and a transmission 14. The vehicle 10 is representative of any movable platform, including planes, trains, automobiles, all-terrain vehicles, and the like. The transmission 14 generally communicates power from the primary mover 12 to wheels or other output members of the vehicle 10.

The primary mover 12 may be, for example and without limitation: an internal combustion engine or an electric machine (also referred to as an electric motor/generator). The transmission 14 may be, for example and without limitation, an automatic gearbox or any other device transferring force to the output members, and may include changes of torque and speed. A control system or controller 16 is in communication with all necessary components of the vehicle 10 and is configured to instruct and manage any of the functions or actions described herein.

The controller 16 may be representative of the entire control and computational architecture of the vehicle 10 or of computational architecture for only some of the powertrain components. The controller 16 includes sufficient memory, processing power, and communication capability to receive signal inputs from, and output commands, data, or instructions to, all systems over which the controller 16 is in command or monitoring.

The controller 16 is an electronic device that is configured, i.e., constructed and programmed, to regulate systems and components of the vehicle 10. The controller 16 may be configured as a central processing unit (CPU) that is also configured to regulate operation of the engine or other primary moves. Alternatively, the controller 16 may be a dedicated controller for only the systems discussed herein. The controller 16 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 16 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 16 may also include a floppy disk, a flexible disk, hard disk, magnetic tape, any other magnetic medium, a CD-ROM, DVD, any other optical medium, etc. The controller 16 can be configured or equipped with other required computer hardware, such as a high-speed clock; requisite Analog-to-Digital (A/D) and Digital-to-Analog (D/A) circuitry; input output circuitry and devices (I/O); as well as appropriate signal conditioning and buffer circuitry. Any algorithms required by the controller 16 or accessible thereby may be stored in the memory and automatically executed to provide the required functionality.

A torque converter assembly, which may be referred to as simply a torque converter 20, connects the primary mover 12 to the transmission 14 of the vehicle 10. In general, the torque converter 20 transfers rotational power between the primary mover 12 and the transmission 14, and may be capable of multiplying torque while doing so.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The vehicle 10, and the components incorporated therewith, may be representative of numerous types vehicles, including planes, trains, and automobiles. Additionally, heavy industrial, construction, and mining equipment may incorporate features of the vehicle 10 or the hinge assembly 10 described herein. The terms front and rear, as used herein as descriptors or as directions, are relative to the typical direction of travel of the vehicle 10.

The torque converter 20 includes an input 22, which may be connected to or incorporate a flywheel and may be referred to simply as input 22, rotationally connected to the primary mover 12 and an output shaft, which may be referred to as simply an output 24, rotationally connected to the transmission 14. The input 22 may also be referred to as the impeller shaft and may include the pump or impeller housing of the torque converter 20. The output 24 may also be referred to as the turbine side or turbine shaft.

As schematically illustrated in FIG. 1, the torque converter 20 includes two different paths for transferring torque and power between the primary mover 12 and the transmission 14. A first torque/power flow path passes through a fluid coupling 30 and a second torque/power flow path passes through a torque converter clutch 40.

Figure 2:
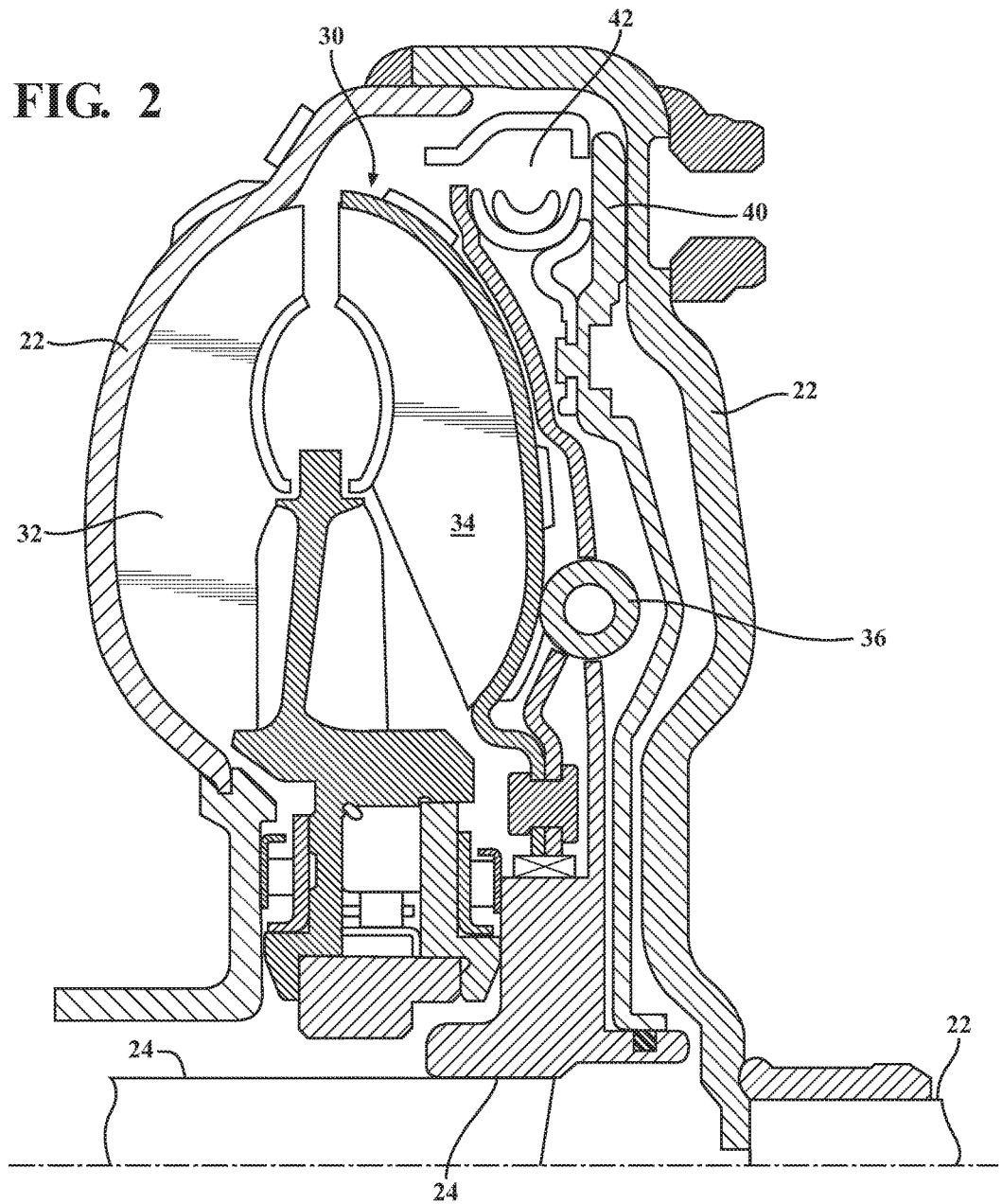
FIG. 2 is a schematic, plane-intersection view of the torque converter shown diagrammatically in FIG. 1, illustrating possible locations for a primary damper and a turbine damper.

Referring also to FIG. 2, there is shown a schematic view of a portion of the torque converter 20. FIG. 2 illustrates half of the torque converter 20 in a plane intersection view, such that elements beyond the view plane are not shown, to better illustrate the internal components of the torque converter 20. Note that the torque converter 20 shown in FIG. 2 is illustrative only, and that other torque converter configurations may be used with the techniques and structures described herein.

The fluid coupling 30 has impeller blades 32 and turbine blades 34 and transfers torque between the impeller blades 32 and the turbine blades 34. The fluid coupling 30 allows the primary mover 12 and the transmission 14 to rotate at different speeds, and torque from the primary mover 12 may be multiplied and transferred to the transmission 14 depending on the speed ratio of the fluid coupling 30.

A mini damper is disposed in line with the fluid coupling 30. In the configuration show, the mini damper is turbine damper 36 that is disposed between the turbine blades 34 of the fluid coupling 30 and the output 24. The turbine damper 36 provides damping when the fluid coupling 30 is providing power transfer through the torque converter 20.

The second torque/power flow path of the torque converter 20 passes through the torque converter clutch 40, which is selectively controlled by the controller 16. The torque converter clutch 40 may be fluidly or mechanically actuated between full engagement, slipping engagement, and disengagement by the controller 16.

The torque converter clutch 40 is configured to selectively transfer torque directly between the input 22 and the output 24. Therefore, when the torque converter clutch 40 is fully engaged—i.e., there is no slipping and both sides of the torque converter clutch 40 are rotating at the same speed—the torque converter 20 transfers torque without utilizing the fluid coupling 30. However, when the torque converter clutch 40 is slipping, both the fluid coupling 30 and the torque converter clutch 40 paths are transferring torque and power through the torque converter 20. When the torque converter clutch 40 is disengaged, only the fluid coupling 30 transfers torque between the input 22 and the output 24.

The primary mover 12, the transmission 14, or differences in rotational characteristics thereof may cause torsional vibrations that propagate through the torque converter 20. Furthermore, conditions at the output (often wheels) of the vehicle 10 may cause torsional vibrations. Above threshold levels, these vibrations may be unpleasant to operators or passengers of the vehicle 10, and may contribute to wear on the powertrain. Therefore, it may be preferable to minimize or counteract these vibrations.

The torque converter 20 also includes a primary damper 42, which is disposed between the output 24 and the torque converter clutch 40. When the torque converter clutch 40 is fully locked or engaged, the primary damper 42 is substantially the only component damping power flow through the torque converter 20. Therefore, the primary damper 42 may be tuned—based on the specific vehicle 10, primary mover 12, and transmission 14—to dampen vibrations occurring while the torque converter clutch 40 is locked and directly transferring torque between the input 22 and the output 24.

Contrarily, in the torque converter 20 the turbine damper 36 is isolated by the locked torque converter clutch 40. Therefore, the power transfer flow path through the turbine damper 36 is bypassed when the torque converter clutch 40 is engaged.

The turbine damper 36 is damping only when the torque converter clutch 40 is disengaged or, as is often the case, partially engaged. Therefore, the turbine damper 36 is tuned to dampen vibrations occurring while the torque converter clutch 40 is slipping.

Furthermore, slipping the torque converter clutch 40, itself, may provide damping for the torque converter 20. The slipping interaction between the friction materials of the torque converter clutch 40 absorbs some energy that would otherwise pass directly between the input 22 and the output 24 when the torque converter clutch 40 is locked, which reduces or absorbs vibrations passing through the torque converter clutch 40.

In many configurations, the controller 16 will intentionally slip the torque converter clutch 40 in order to dampen vibrations that would exceed preferred levels if the torque converter clutch 40 were fully locked. However, slipping the torque converter clutch 40 may decrease the drivetrain efficiency and fuel economy of the vehicle 10 relative to fully locking the torque converter clutch 40. Therefore, it may be preferable to limit the amount of slip introduced solely to dampen vibrations.

A control scheme for the vehicle 10 utilizes the torque converter clutch 40 to damp vibrations passing through the torque converter 20. Vibrations may be estimated by the controller 16 or measured by one or more sensors (not shown) in the powertrain. When the torque converter clutch 40 is locked, or in conditions in which it is preferable to be locked, and vibrations exceed the vibration threshold, the controller 16 introduces slip to the torque converter clutch 40 in order to dampen the vibrations.

Introduction of slip to the torque converter clutch 40 causes some torque to pass through the fluid coupling 30, because the input 22 and the output 24 are no longer rotating in unison. Depending on the slip amount, significant engine vibrations may pass through the path of the fluid coupling 30. At a speed ratio close to 1, the damping capability of the fluid coupling 30 is limited, and vibrations can pass through and excite the driveline downstream.

The turbine damper 36 is in series with the fluid coupling 30 and parallel to the torque converter clutch 40 and the primary damper 42. Therefore, the turbine damper 36 is also damping vibrations passing through the torque converter 20 when the torque converter clutch 40 is slipping, (i.e., when torque path through the fluid coupling 30 is active).

If the turbine damper 36 was not included to provide damping, the controller 16 would only be able to slip the torque converter clutch 40 to produce extra damping capability over that provided by the primary damper 42. When the torque converter clutch 40 is slipping, engine torque oscillations may pass through both the passages of the fluid coupling 30 and torque converter clutch 40. The damping capacity of the fluid coupling 30 and torque converter clutch 40 depend on the slip level of the torque converter clutch 40. The controller 16 can increase the level of slip in the torque converter clutch 40 to alter the amount of damping needed. Therefore, the added damping capability of the turbine damper 36 may add to the damping capability of the fluid coupling 30 torque path, thus reducing the amount of slip needed from the torque converter clutch 40. Reducing slip generally increases the fuel economy of the powertrain by reducing slip losses in the torque converter 20.

For example, where the primary mover 12 is rotating at approximately 1500 revolutions per minute (RPM) and with a fixed wheel load, the vehicle 10 may experience a noticeable decrease in needed slip from the torque converter clutch 40 as a result of the turbine damper 36. In configurations without the turbine damper 36, the torque converter clutch 40 may need to slip as much as 30 RPM in order to reduce vibrations to less than the vibration threshold. However, with the turbine damper 36, the torque converter clutch 40 may need to slip as little as 10 RPM to reduce vibrations below the same vibration threshold. Therefore, the turbine damper 36 has reduced the amount of slip that the controller 16 needs to implement to dampen the system by approximately one-third, which improves fuel economy for those operating conditions.

Referring also to FIGS. 3-6, and with continued reference to FIGS. 1 and 2, there are shown additional damping configurations of torque converter assemblies. Operation of the assemblies shown in FIGS. 3-6 may be similar to that shown and described relative to FIGS. 1-2, such that some components may not be separately illustrated or described. Note that FIGS. 3-6 show only some possible configurations, and others may be utilized within the scope of the disclosures herein.

Figure 3:
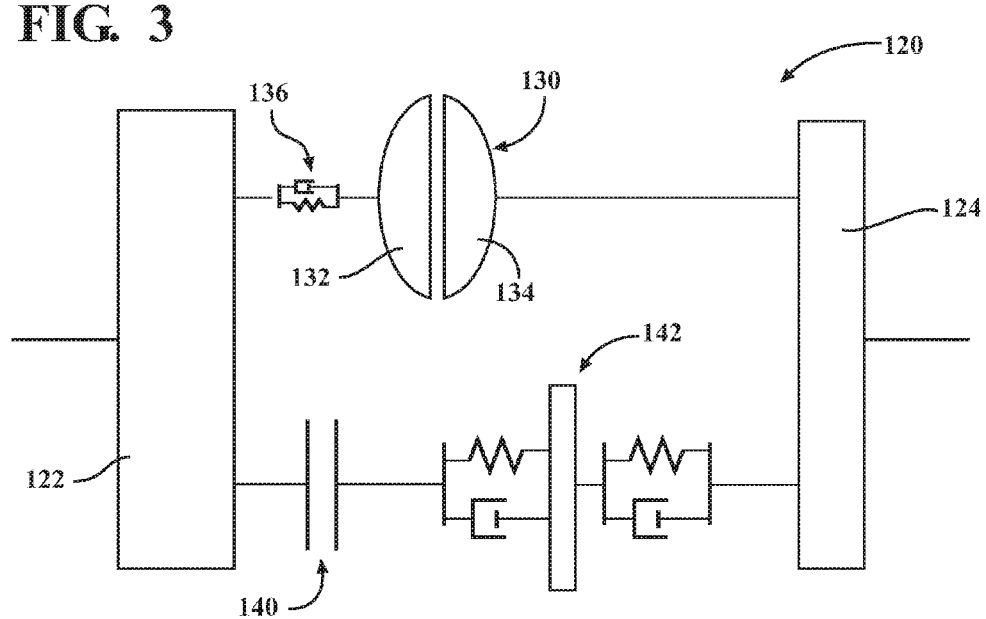
FIG. 3 is a schematic diagram of a torque converter configured with a mini damper in series with a fluid coupling and parallel to a torque converter clutch and a primary damper.

FIG. 3 shows a schematic diagram of a torque converter or torque converter assembly 120, which is configured to transfer power and torque between an input 122 and an output 124. A fluid coupling 130 provides one torque flow path between the input 122 and the output 124 by transferring, and possibly multiplying, torque between an impeller 132 and a turbine 134.

The torque converter assembly 120 includes a mini damper 136 in series with the fluid coupling 130 and in parallel with a torque converter clutch 140 and to a primary damper 142. In the configuration shown, the mini damper 136 is disposed between the input 122 and the impeller 132. The torque converter clutch 140 selectively locks the input 122 to the output 124, such that, when locked, substantially all torque transfer occurs through the torque converter clutch 140, as opposed to the fluid coupling 130.

System damping is provided via the primary damper 142 and slipping of the torque converter clutch 140. The mini damper 136 is provided in line with the fluid coupling 130 to increase damping capability when the fluid coupling 130 is transferring torque through the torque converter assembly 120.

Without the mini damper 136, vibrations exceeding threshold levels are either passed through the torque converter assembly 120 or accounted for via increased slipping of the torque converter clutch 140. However, increasing slip of the torque converter clutch 140 decreases driveline efficiency, which may negatively effect fuel efficiency of the vehicle. Therefore, the mini damper 136 increases damping capability of the torque converter assembly 120, which reduces the amount of slip required of the torque converter clutch 140 and improves driveline efficiency.

Figure 4:
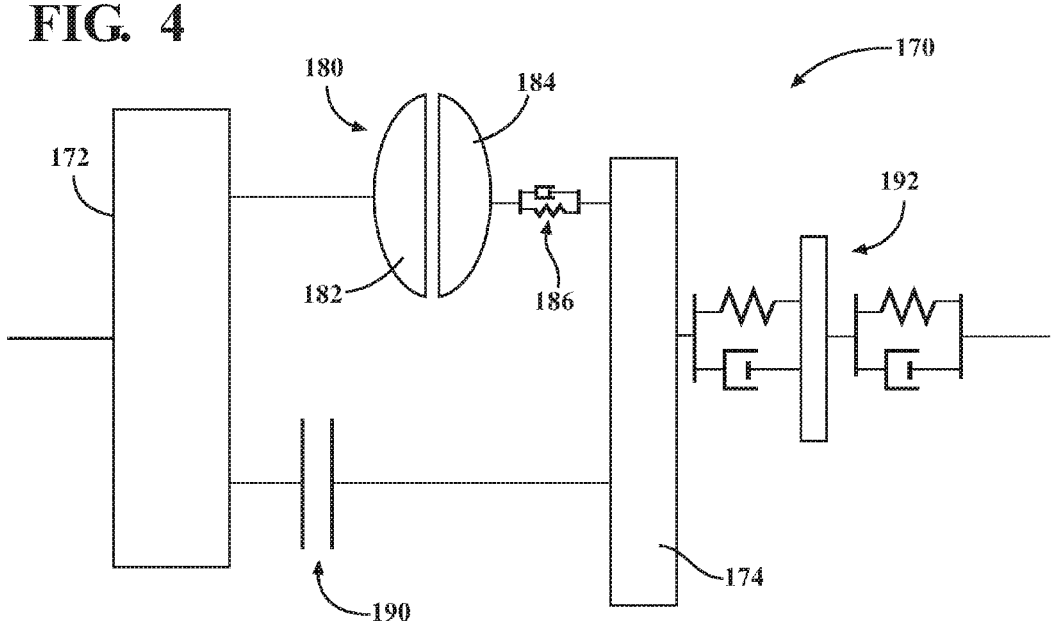
FIG. 4 is a schematic diagram of a torque converter configured with a mini damper in series with a fluid coupling and a primary damper, and parallel to a torque converter clutch.

FIG. 4 shows a schematic diagram of a torque converter or torque converter assembly 170, which is configured to transfer power and torque between an input 172 and an output 174. A fluid coupling 180 provides one torque flow path between the input 172 and the output 174 by transferring, and possibly multiplying, torque between an impeller 182 and a turbine 184.

The torque converter assembly 170 includes a mini damper 186 that is in series with the fluid coupling 180 and that is parallel to a torque converter clutch 190. In the configuration shown, the mini damper 186 is located between the turbine 184 and the output 174. The torque converter clutch 190 selectively locks the input 172 to the output 174, such that, when locked, substantially all torque flow occurs through the torque converter clutch 190, as opposed to the fluid coupling 180.

A primary damper 192 is disposed on the output 174, such that it is in series with both the fluid coupling 180 and the torque converter clutch 190. System damping is provided via the primary damper 192 and selective slipping of the torque converter clutch 190. The mini damper 186 is provided in line with the fluid coupling 180 to increase damping capability when the fluid coupling 180 is transferring torque through the torque converter assembly 170.

Without the mini damper 186, vibrations exceeding threshold levels are either passed through the torque converter assembly 170 or accounted for via increased slipping of the torque converter clutch 190. However, increasing slip of the torque converter clutch 190 decreases driveline efficiency, which may negatively effect fuel efficiency of the vehicle. Therefore, the mini damper 186 increases damping capability of the torque converter assembly 170, which reduces the amount of slip required of the torque converter clutch 190 and improves driveline efficiency.

Figure 5:
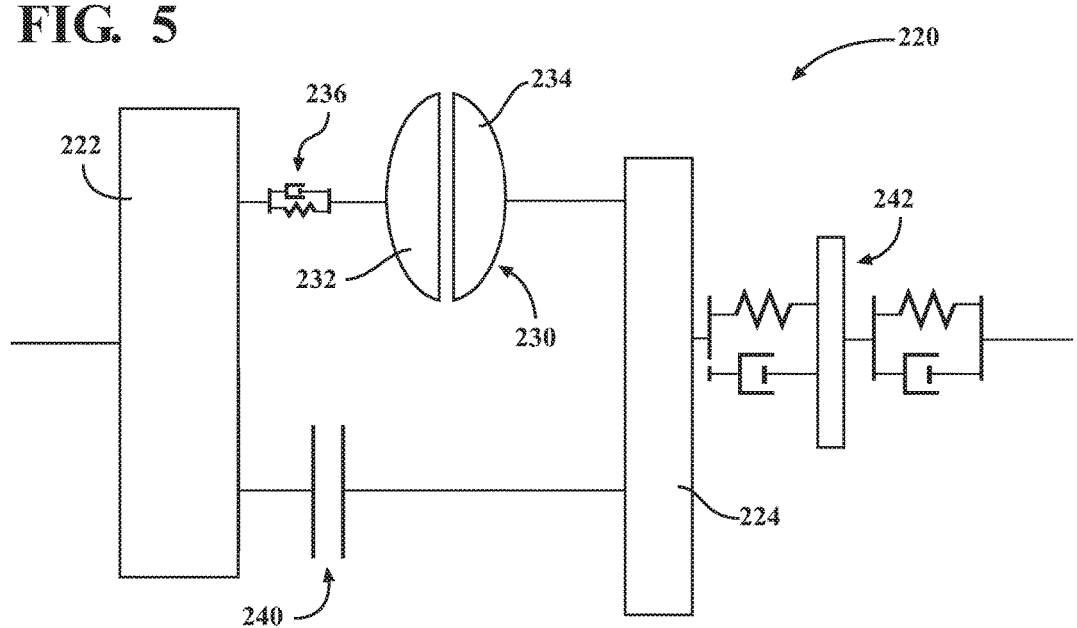
FIG. 5 is a schematic diagram of a torque converter configured with a mini damper in series with a fluid coupling and a primary damper, and parallel to a torque converter clutch.

FIG. 5 shows a schematic diagram of a torque converter or torque converter assembly 220, which is configured to transfer power and torque between an input 222 and an output 224. A fluid coupling 230 provides one torque flow path between the input 222 and the output 224 by transferring, and possibly multiplying, torque between an impeller 232 and a turbine 234.

The torque converter assembly 220 includes a mini damper 236 that is in series with the fluid coupling 230 and parallel with a torque converter clutch 240. In the configuration shown, the mini damper 236 is located between the input 222 and the impeller 232. The torque converter clutch 240 selectively locks the input 222 to the output 224, such that, when locked, substantially all torque flow occurs through the torque converter clutch 240, as opposed to the fluid coupling 230.

A primary damper 242 is disposed on the output 224, such that it is in series with both the fluid coupling 230 and the torque converter clutch 240. System damping is provided via the primary damper 242 and selective slipping of the torque converter clutch 240. The mini damper 236 is provided in line with the fluid coupling 230 to increase damping capability when the fluid coupling 230 is transferring torque through the torque converter assembly 220.

Without the mini damper 236, vibrations exceeding threshold levels are either passed through the torque converter assembly 220 or accounted for via increased slipping of the torque converter clutch 240. However, increasing slip of the torque converter clutch 240 decreases driveline efficiency, which may negatively effect fuel efficiency of the vehicle. Therefore, the mini damper 236 increases damping capability of the torque converter assembly 220, which reduces the amount of slip required of the torque converter clutch 240 and improves driveline efficiency.

Figure 6:
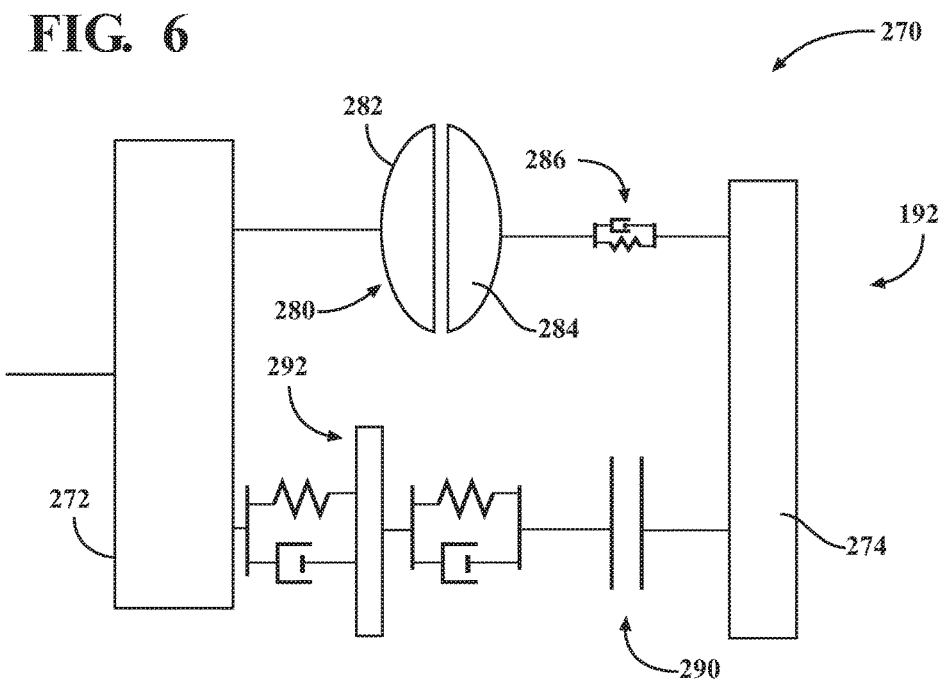
FIG. 6 is a schematic diagram of a torque converter configured with a mini damper in series with a fluid coupling and parallel to a torque converter clutch and a primary damper.

FIG. 6 shows a schematic diagram of a torque converter or torque converter assembly 270, which is configured to transfer power and torque between an input 272 and an output 274. A fluid coupling 280 provides one torque flow path between the input 272 and the output 274 by transferring, and possibly multiplying, torque between an impeller 282 and a turbine 284.

The torque converter assembly 270 includes a mini damper 286 in series with the fluid coupling 280 and in parallel with a torque converter clutch 290 and a primary damper 292. In the configuration shown, the mini damper 286 is disposed between the turbine 284 and the output 274.

The torque converter clutch 290 selectively locks the input 272 to the output 274, such that, when locked, substantially all torque transfer occurs through the torque converter clutch 290, as opposed to the fluid coupling 280. In the configuration shown, the primary damper 292 is disposed between the input 272 and the torque converter clutch 290.

System damping is provided via the primary damper 292 and slipping of the torque converter clutch 290. The mini damper 286 is provided in line with the fluid coupling 280 to increase damping capability when the fluid coupling 280 is transferring torque through the torque converter assembly 270.

Without the mini damper 286, vibrations exceeding threshold levels are either passed through the torque converter assembly 270 or accounted for via increased slipping of the torque converter clutch 290. However, increasing slip of the torque converter clutch 290 decreases driveline efficiency, which may negatively effect fuel efficiency of the vehicle. Therefore, the mini damper 286 increases damping capability of the torque converter assembly 270, which reduces the amount of slip required of the torque converter clutch 290 and improves driveline efficiency.

The detailed description and the drawings or figures are supportive and descriptive of the subject matter discussed herein. While some of the best modes and other embodiments for have been described in detail, various alternative designs, configurations, and embodiments exist.

The invention claimed is:

1. A torque converter operatively connecting a primary mover and a transmission, comprising:
   an input rotationally connected to the primary mover;
   an output rotationally connected to the transmission;
   a fluid coupling having impeller blades and turbine blades, wherein the fluid coupling transfers torque between the impeller blades and the turbine blades when the input and the output are rotating at different speeds;
   a mini damper disposed in line with the fluid coupling between the input and the output;
   a torque converter clutch configured to selectively lock, such that torque is transferred directly between the input and the output;
   a primary damper disposed in line with the torque converter clutch between the input and the output; and
   a controller configured to:
      selectively, and variably slip the torque converter clutch, such that a portion of torque less than that transferred when the torque converter clutch is locked is transferred between the input and the output;
      sense vibrations passing between the input and the output;
      compare the sensed vibrations to a threshold;
      if the sensed vibrations exceed the threshold, increasing the slip of the torque converter clutch; and
      if the sensed vibrations do not exceed the threshold, decreasing the slip of the torque converter clutch.

2. The torque converter of claim 1, wherein the mini damper is disposed between the turbine blades and the output.

3. The torque converter of claim 1, wherein the mini damper is disposed between the input and the impeller blades.

4. The torque converter of claim 1, wherein the mini damper is isolated when the torque converter clutch is locked.

5. The torque converter of claim 4, wherein the mini damper is disposed between the turbine blades and the output.

6. The torque converter of claim 4, wherein the mini damper is disposed between the input and the impeller blades.

7. A vehicle, comprising:
   a primary mover;
   a transmission;
   a torque converter operatively connecting the primary mover and the transmission, the torque converter including:
      an input rotationally connected to the primary mover;
      an output rotationally connected to the transmission;
      a fluid coupling having impeller blades and turbine blades, wherein the fluid coupling transfers torque between the impeller blades and the turbine blades when the input and the output are rotating at different speeds;
      a mini damper disposed in line with the fluid coupling between the input and the output; and
      a torque converter clutch configured to selectively lock, such that torque is transferred directly between the input and the output; and a primary damper disposed in line with the torque converter clutch between the input and the output, wherein the mini damper of the torque converter is isolated when the torque converter clutch is locked.

8. The torque converter of claim 7, wherein the mini damper is disposed between the turbine blades and the output.

9. The torque converter of claim 7, wherein the mini damper is disposed between the input and the impeller blades.

* * * * *